(12) United States Patent
Dille

(10) Patent No.: US 8,899,147 B2
(45) Date of Patent: Dec. 2, 2014

(54) COMPACT BLENDER FOR FRUIT JUICE

(76) Inventor: Joost Arthur Dille, Santiago (CL)

( * ) Notice: Subject to any disclaimer, the term of this patent is extended or adjusted under 35 U.S.C. 154(b) by 31 days.

(21) Appl. No.: 13/148,757

(22) PCT Filed: Sep. 14, 2010

(86) PCT No.: PCT/CL2010/000037
§ 371 (c)(1),
(2), (4) Date: Aug. 10, 2011

(87) PCT Pub. No.: WO2012/034246
PCT Pub. Date: Mar. 22, 2012

(65) Prior Publication Data
US 2013/0287913 A1    Oct. 31, 2013

(51) Int. Cl.
*A47J 43/046*    (2006.01)
(52) U.S. Cl.
CPC ..................... *A47J 43/046* (2013.01)
USPC .................. 99/510; 99/502; 99/536; 366/205
(58) Field of Classification Search
USPC .................. 99/501, 502, 509, 510, 516, 536; 426/559, 519; 366/205, 172.1, 168.1, 366/138
See application file for complete search history.

(56) References Cited

U.S. PATENT DOCUMENTS

| | | | | |
|---|---|---|---|---|
| 1,874,079 A | * | 8/1932 | Black | 241/97 |
| 3,214,143 A | * | 10/1965 | Jamison | 366/182.2 |
| 3,630,777 A | * | 12/1971 | Ishizawa et al. | 134/22.19 |
| 4,324,494 A | * | 4/1982 | Pryor et al. | 366/156.1 |
| 5,323,691 A | * | 6/1994 | Reese et al. | 99/275 |
| 5,480,095 A | * | 1/1996 | Stevenson et al. | 239/104 |
| 6,431,744 B1 | * | 8/2002 | Ash et al. | 366/205 |
| 6,758,592 B2 | * | 7/2004 | Wulf et al. | 366/205 |
| 7,673,824 B2 | * | 3/2010 | Stamper et al. | 241/97 |
| 7,871,195 B2 | * | 1/2011 | Larsen et al. | 366/194 |
| 2007/0041268 A1 | * | 2/2007 | Beesley et al. | 366/195 |
| 2009/0235831 A1 | * | 9/2009 | Nisonov | 100/112 |

FOREIGN PATENT DOCUMENTS

DE    19723486 A1    12/1998

OTHER PUBLICATIONS

International Search Report and written opinion of Mar. 29, 2011 for International Application No. PCT/CL2010/000037 of Joost Arthur Dille for a Compact Blender for Fruit Juice.

* cited by examiner

*Primary Examiner* — Henry Yuen
*Assistant Examiner* — John J Norton
(74) *Attorney, Agent, or Firm* — Thomas W. Tolpin

(57) ABSTRACT

A compact blender with a drinking water connection tube, supporting conventional tap water connections has a water dosing valve to pressure water distributed to the blending compartment or jug. Water flows from the connection tube, to a splitting device, from where inlet tubes that allow passing of water inside the blending compartment. The lid has external protrusions with inner cavities connected a duct with holes that introduce drinking water inside the blending compartment. When the frozen fruit capsule is introduced through the lid and the operation button is pushed, the exact amount of water is dosed by the water dosing valve. When water enters the blending compartment, the motor starts running turning the axle of the rotor and blades, so that water is mixed with the frozen fruit capsule thus generating the juice to be dispensed.

15 Claims, 15 Drawing Sheets

COMPACT BLENDER FOR FRUIT JUICE

TECHNICAL FIELD OF THE INVENTION

This invention relates to a compact blender and a method to process foodstuffs, especially for fast preparation of fruit juice for immediate consumption at points of sale such as restaurants, bars, supermarkets, and offices as well as for household use. The main application of the machine of this invention is the preparation of natural juice based on frozen fruit pulp. One of the advantages of this blender is its efficient and simple preparation of juice by using a device for automated preparation. Also, this machine is able to dispense different flavors between one serving and another, without the need of having the operator clean the blending compartment, and without including different compartments in the device for pre-prepared juice of different flavors. For preparation of the juice, it is only necessary to introduce a capsule with frozen pulp in the blending compartment or jug and to push the start button. The system automatically fills the jug with the necessary amount of water and the drink is poured into a cup through an automatic dispenser. Once this process is done, the machine is automatically cleaned, thus ready for the next preparation.

BACKGROUND OF THE INVENTION

There is a great variety of machines used as traditional blenders in the prior art to process blocks of frozen pulp, typically in 1 kg packages. The traditional process requires removing the pulp from the package and cutting a piece therein by hand. If too much pulp is cut, the juice is too sweet or concentrated; otherwise, the resulting juice is watery with a different flavor on a case-by-case basis. Subsequently, the pulp should be introduced into the blender jug and water should be poured into it. However, if too much water is added, the juice is watery; otherwise, the juice is too sweet or concentrated, also resulting in a different flavor on a case-by-case basis. A time interval is also required between turning the blender on and off. Thus, the blending time may be insufficient if the operator must also do other activities at the bar or working station. Once the blender is turned off, taking the jug off and pouring the juice into a cup is required. Finally, cleaning the jug and lid of the blender by hand is required. All these handlings require a time cycle that may take about 70 seconds.

This invention embodies a compact blender and a method to process juice in a simple way, using an individual package of frozen fruit pulp and drinking water as the basic ingredients. In this case, the process consists of taking the frozen pulp from the package and putting it into the blender. Due to its individual package, the juice is of consistent quality and does not depend on the operator's actions. The machine is equipped with just one operation button. By pushing said button, the blender automatically doses the required amount of water, operates at two speeds, and then automatically dispenses the juice into a cup. After this, the machine is automatically self-cleaned. The advantage of this is that the operator has enough time to do other activities at the bar or working area after pushing the start button, without being concerned about the juice-making process since the blender performs the rest of the process automatically. The process takes about 25 seconds, of which 18 seconds may be used by the operator for other activities. After filling the cup with the exact amount of juice, the blender cleans itself and is ready to prepare another cup of juice.

There is a great number of blenders with different qualities in the current state of the art. For example, patent document U.S. Pat. No. 4,681,030 (Herbert) dated Dec. 20, 1986 discloses a machine to prepare frozen drinks consisting of a dispenser that feeds directly into the blender. The ice dispenser and the blender are comprised in the same module. It has a timer operating together with the blender and the ice dispenser by the push of only one button. This allows dispensing the exact amount of ice and the time required for the process.

Also, document U.S. Pat. No. 5,323,691 (Reese et al.) dated Jun. 28, 1994 discloses a device to prepare blended drinks, in particular frozen drinks, that consists of an ice dispenser, a dispenser for the liquid mix, and a blender all combined in one single unit. It has a programmable timer that regulates the period of operating time for the ice dispenser, the dispenser of liquid mix, and the blender. The operation, thus, is limited to pushing buttons. The device automatically delivers a proper amount of ice and liquid to the blender to be mixed in the exact amount of time.

The document U.S. Pat. No. 3,630,777 (Ishizawa et al.) dated Dec. 28, 1971, discloses a cleaning method for tanks through a shower system. With this, the internal walls of a cylindrical container are cleaned with water, which is also discharged through a duct located at the bottom of the tank.

Document U.S. Pat. No. 4,324,494 (Pryor et al) dated Apr. 13, 1982 discloses a dispenser of liquid containing a blending system that mixes water with a powdered product ("powdered juice") for a drink to be produced. It includes a blender for mixing. Water is automatically delivered to the mix. The mixed drink is delivered to the cup without the need of using a valve; the design and movement of the blade controls the outflow of drink. It also has a cleaning system between one process and the other to remove liquid waste.

Document U.S. Pat. No. 5,544,572 (Garmendia) dated Aug. 13, 1996, describes an automatic machine to prepare and dispense fruit juice and which consists of a modular, dismountable system with a compartmentalized cabinet-frame from which the following modules can be identified: one module for fruit storage; one feeding module that moves the pieces; one squeezing module with a motor unit; intermediate washing device; cutter; rotary dosing devices; squeezing unit; deposit for the juice with level gauge and overflow; one grinding module coupled to the squeezing module; one freezing module; one programmable control module; and possible deposits of water.

Document WO 93/09684 (Martens) dated May 27, 1993, discloses a method and a device to process a frozen paste of a drinkable product ready for processing, such as fruit juice or similar. Said paste is frozen-stored in a container. The method is characterized by the following steps: heating the container in all its sides during a preset time and separating the frozen paste from the container. The use of the device mechanically divides the frozen paste into smaller pieces, and heat is gradually supplied to the paste in a way that the maximum temperature of the liquid obtained may preferably raise by 2° C. and to a maximum of 5° C. This process ensures the quality of the product.

Document DE 3208569 (Granini GmbH) dated Sep. 22, 1983 discloses a dispensing device for fruit juice mainly consisting of a parallel tubed-shaped casing arranged in the upper part, a frozen compartment, and a supporting plate in the lower part designed to hold a drinking container. The frozen compartment is also equipped with a plastic bag packaged in a cardboard envelope with concentrated fruit juice. The plastic bag provides for a feeding tube that is guided by a constriction tube pump. There is a tube for fresh water connected to the dispensing device that can be connected to the drinking water service lines through one of its openings. The free end of the dosing tube is surrounded by a funnel in the form of a transparent screen. The tube for drinking water has a refrigerant agent with a shut-off valve that can be operated through the motor of the constriction tube pump. The operation of the shut-off valve and the motor of the constriction tube pump is programmed to release a fixed amount of fruit juice concentrate and drinking water respectively, that are then introduced in a container for drinking and mixed by the turbulence that is created at the same time.

Generally in the prior art the only alternative way to produce juice from pieces of frozen fruit pulp was by using a standard blender. In addition to being slower, as all processes are performed manually, the final result does not have a consistent quality. When an excess of water is added to the pulp, the juice is less distinctive in its flavor and more watery. When insufficient water is added to the pulp, the juice is too sweet and thick.

The aspects differentiating the machine of the present invention from the equipment already known in the prior art is that this machine performs specific operations to automatically prepare fruit juice by using capsules of frozen fruit pulp as the main ingredient.

Also, all documents of the prior art present complex solutions to the problem of dispensing an individual serving of juice. None of the documents previously described discloses a compact, simple machine that allows the following processes to be performed by pushing just one button: processing an individual package or capsule of frozen fruit, quickly producing a ready-to-serve cup of juice, wherein such a machine also has a self-cleaning mechanism that leaves the machine ready to be used again in just a few seconds.

SUMMARY OF THE INVENTION

The present invention relates to a compact blending machine and a method for processing foodstuff, especially the quick preparation of fruit juice in individual servings for immediate consumption at points of sale such as restaurants, bars, supermarkets, and offices as well as for home use. This machine can also dispense different flavors from one serving to the next without the need of having the operator clean the blending compartment between servings. The basic ingredient for the preparation process is frozen fruit pulp. This pulp should not be mistaken for the so-called fruit concentrate. The pulp used in the machine is 100% natural fruit, from which water has been removed through a quick freezing process. The pulp contains all fruit ingredients including vitamins and minerals. The pulp must be kept frozen as it is highly perishable (not pasteurized, no preservatives added). By adding water to the frozen pulp and mixing, a natural fruit juice can be obtained. While this production process is widely used at industrial level, the machine of the present invention is a compact machine suitable for use in restaurants, bars, supermarkets, offices and even homes, which automatically prepares portions for immediate consumption using the same principle.

The machine mainly comprises: means to connect to a water faucet or to fixtures of the public utility system that have a pre-set pressure or to a water-dosing valve, a jug or compartment for the blended product and lid, an electric motor, outlet valves, a control/processing unit; and a connection for discharge.

If there is no tap water connection available near the machine, it can be connected to a water supply tank while the connection to a sewer can be made through a storage tank for waste water.

The individual-serving package of frozen fruit pulp is the basic ingredient used by the machine. This individual package or capsule may be introduced by hand, for instance in the version for use at homes, or automatically in the case of a version for a high rate of consumption or a professional version. The professional version of the machine can be used in restaurants, bars, offices, shops, etc. In the latter case, the base technology is the same, but a compartment for storing and handling the capsule is added to facilitate automatic selection and the introduction of fruit capsules into the machine. The operation method of the machine involves the steps of: (a) opening the lid of the jug and introducing the capsule of frozen fruit pulp into the blending compartment; (b) placing the cup below the dispenser; (c) pushing the start button. When the start button is pushed, the machine automatically performs the following steps: (d) adding the exact amount of water through the dosing valve, irrespective of water pressure; (e) mixing the pulp with water in the blending compartment through the blades of the rotor driven by an electric motor which runs at two different speeds in order to ensure the best mixing; (f) opening the outlet valve to dispense the juice, using only the force of gravity and without the need for a pumping device; (g) closing the outlet valve, rinsing the blender compartment, and discharging the waste water.

At the end of the working day, a self-cleaning program can be executed. Therefore, the blender compartment can be filled with a certain amount of boiling water and if necessary a commercial cleansing tablet can be added. A jug should be placed under the dispenser. After that, the cleaning button should be pushed for the thorough daily cleaning to start.

By pushing the cleaning button, the machine performs the following steps: (h) turning the rotor blades of the blending machine through the electric motor so as to dissolve the cleansing tablet; (i) consecutive opening and closing of valves to clean the valves, tubes and dispenser; (j) rinsing the blending compartment or jug; and (k) removing waste water through the discharge tube connected to a storage tank or drain. Some of the parts such as the blending compartment or jug and lid can be dismounted from the machine for manual cleaning.

BRIEF DESCRIPTION OF FIGURES

Figures attached hereto are included for a better understanding of the invention, and are part of both the invention and its preferred embodiment.

DESCRIPTION OF THE INVENTION

Figure 1:
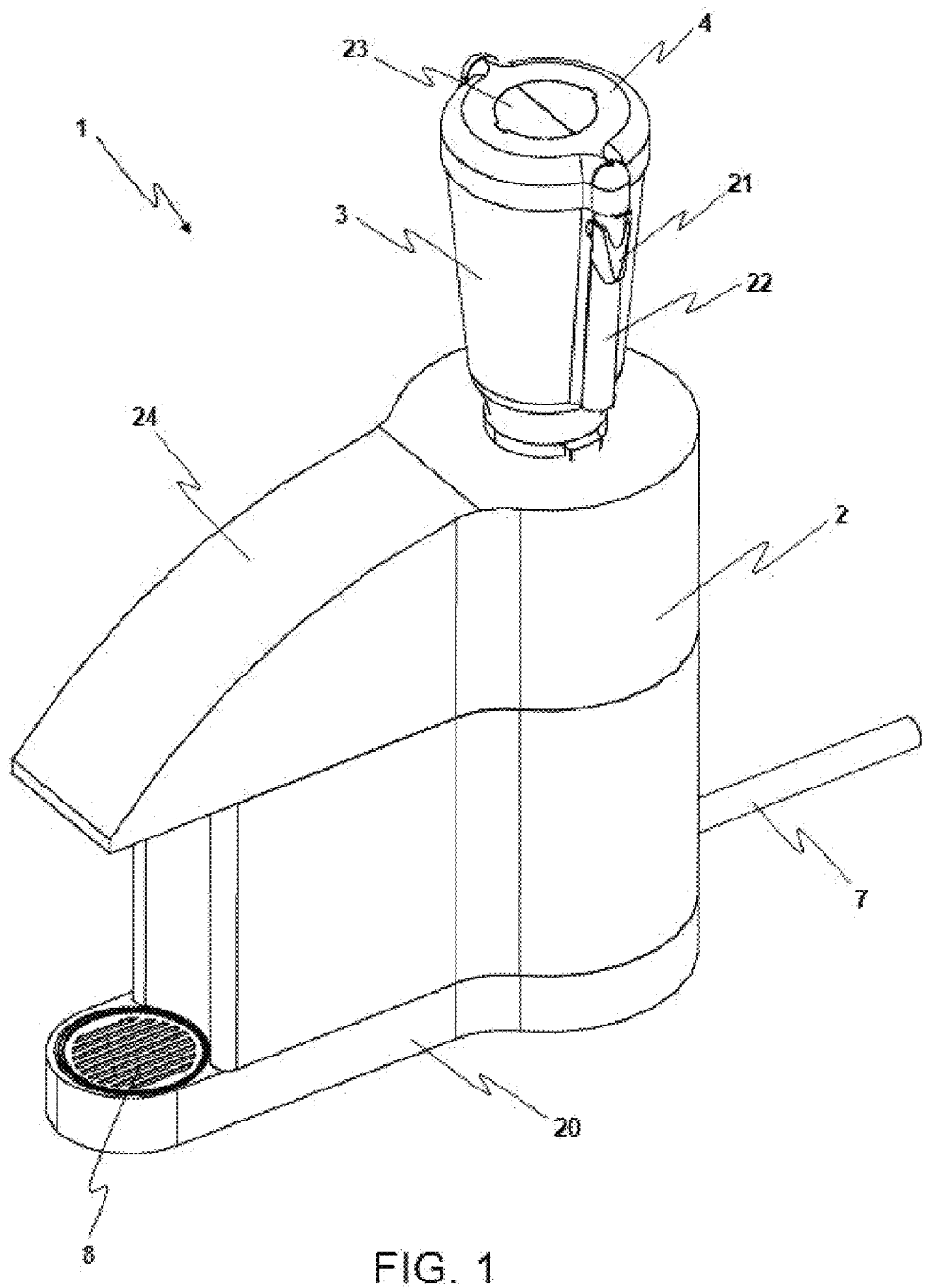
FIG. 1 shows an upper view of the machine of this invention with its casing and jug which comprise the blending compartment.
Figure 2:
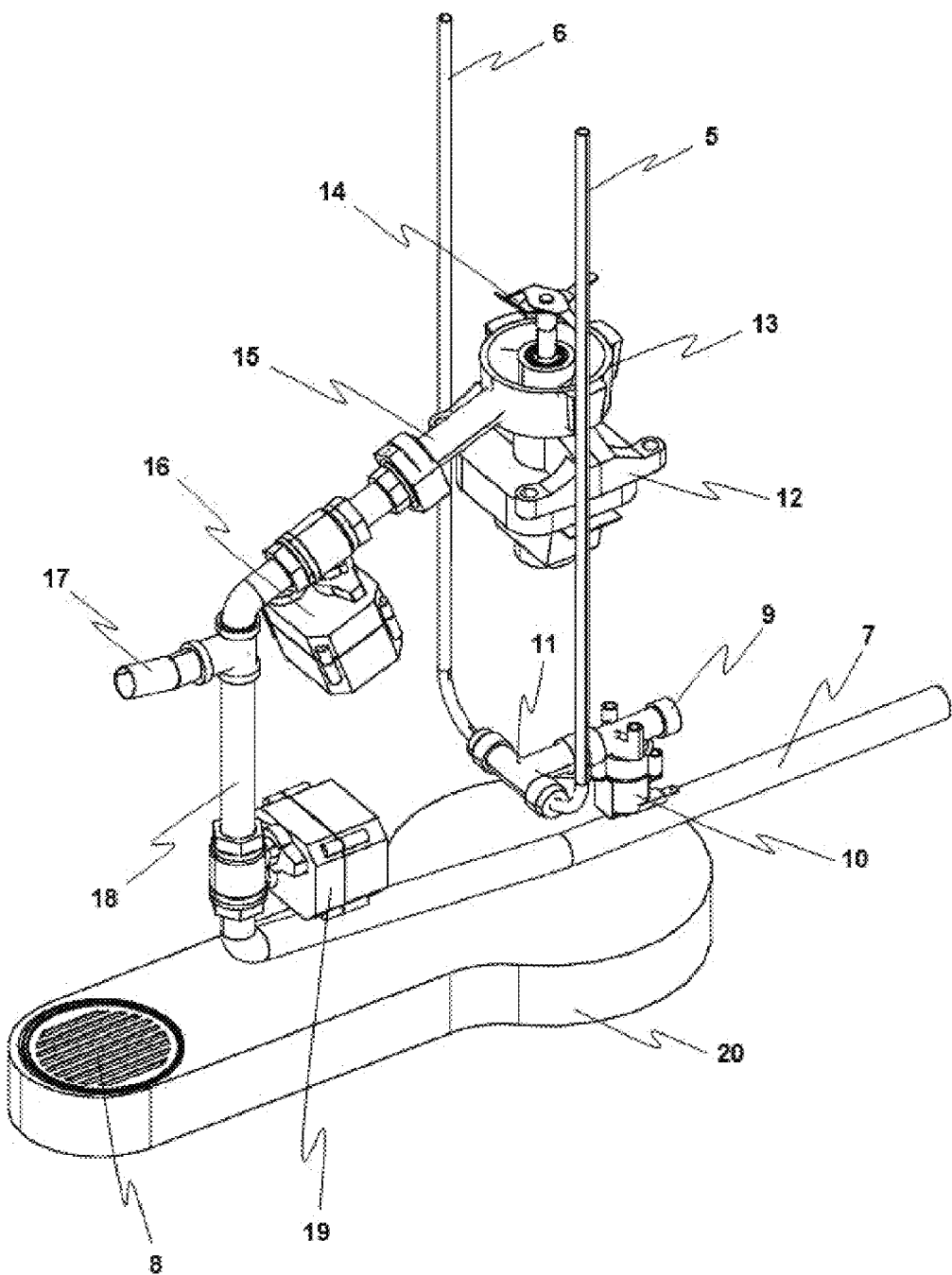
FIG. 2 shows the front upper view of internal components of the machine of this invention.
Figure 3:
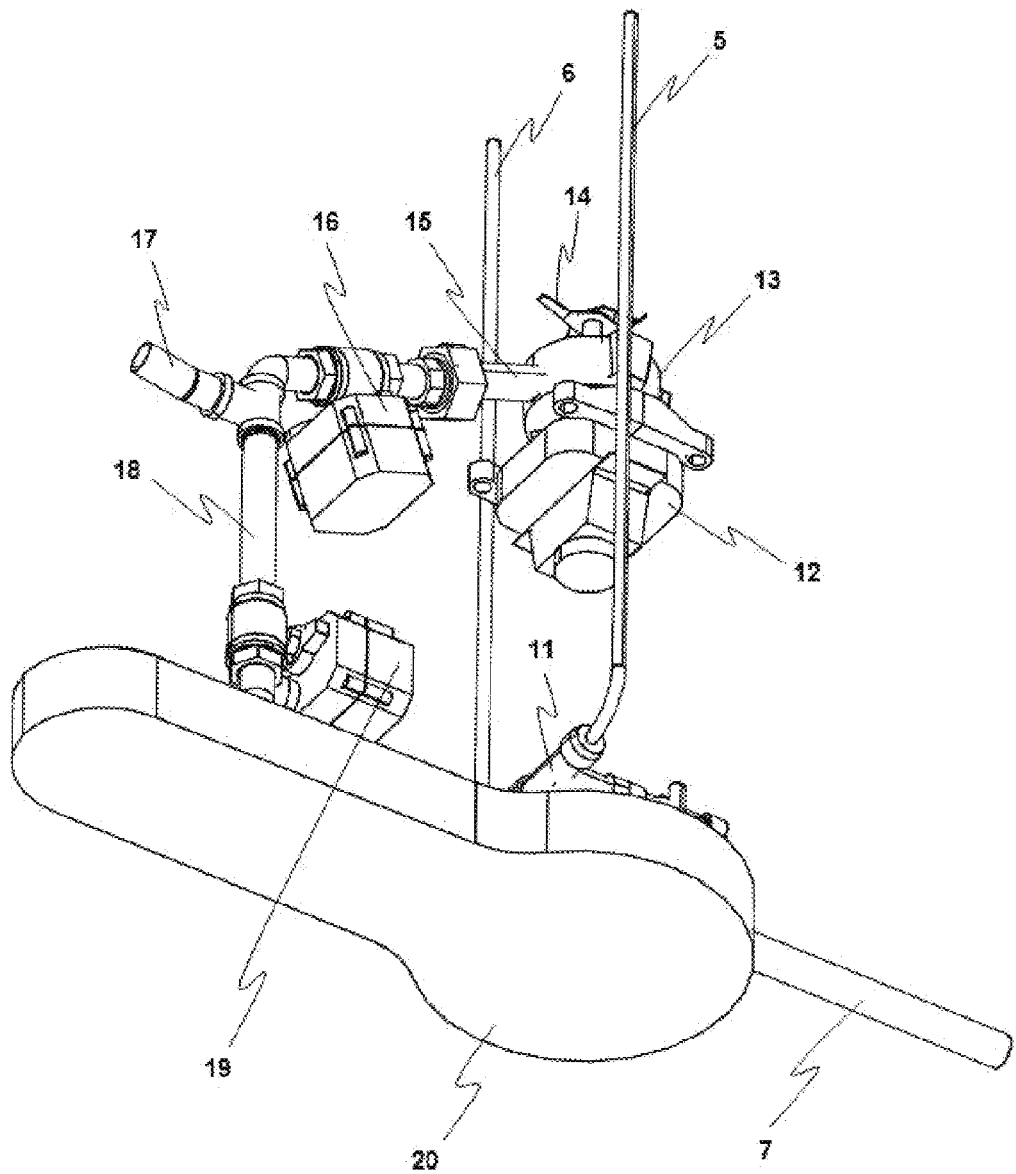
FIG. 3 shows the front lower view of internal components of the machine of this invention.
Figure 4:
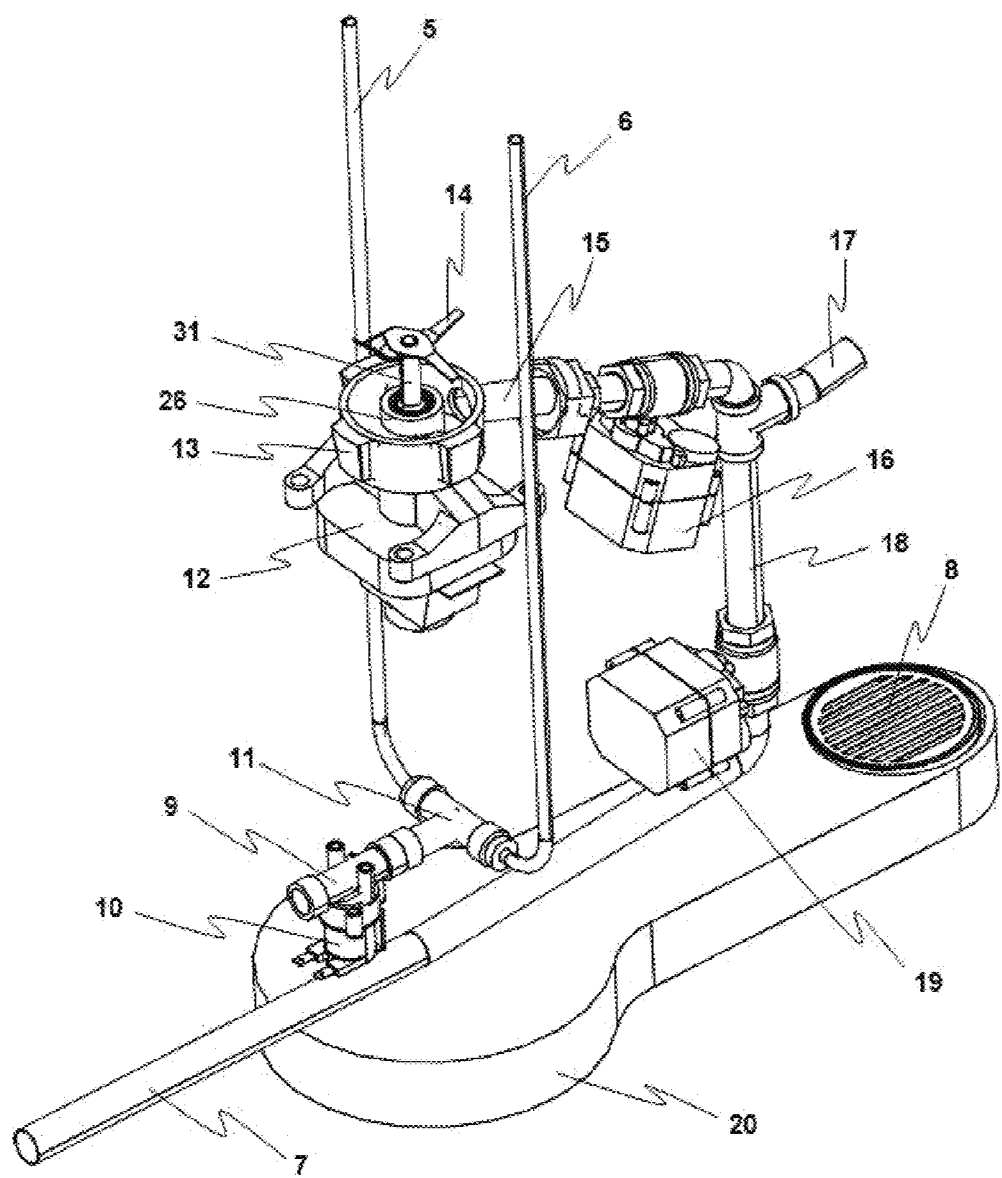
FIG. 4 shows the rear upper view of internal components of the machine of this invention.
Figure 5:
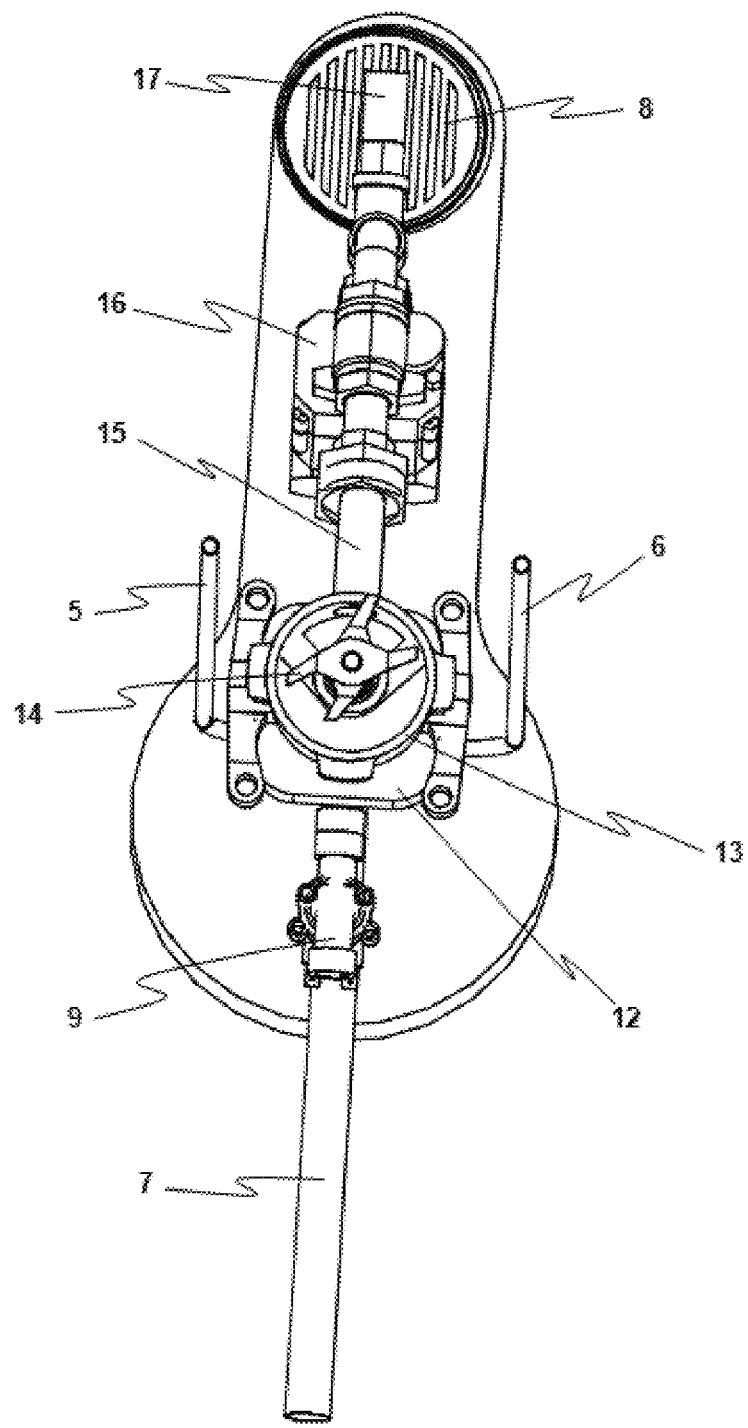
FIG. 5 shows an upper plan view of internal components of the machine of this invention.
Figure 6:
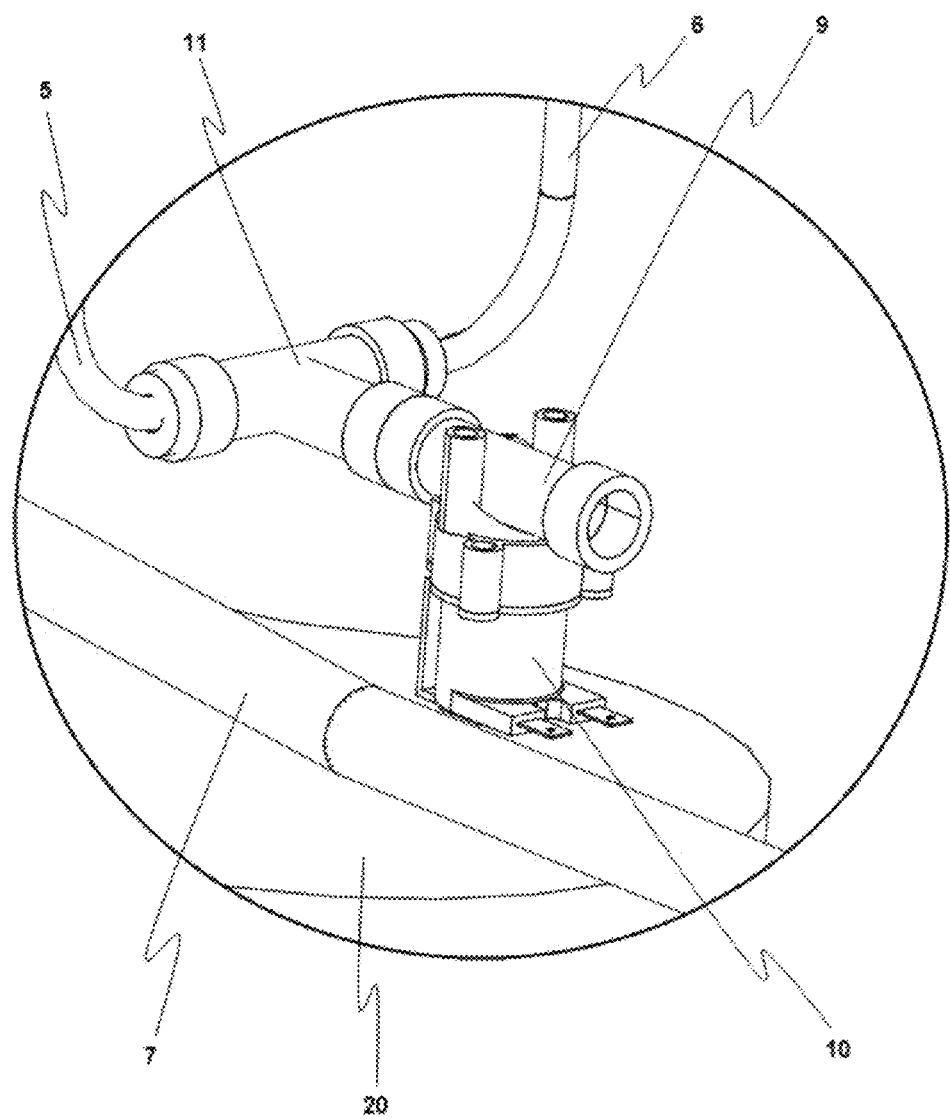
FIG. 6 shows an enlarged view of the drinking water supply system for the machine of this invention.
Figure 7:
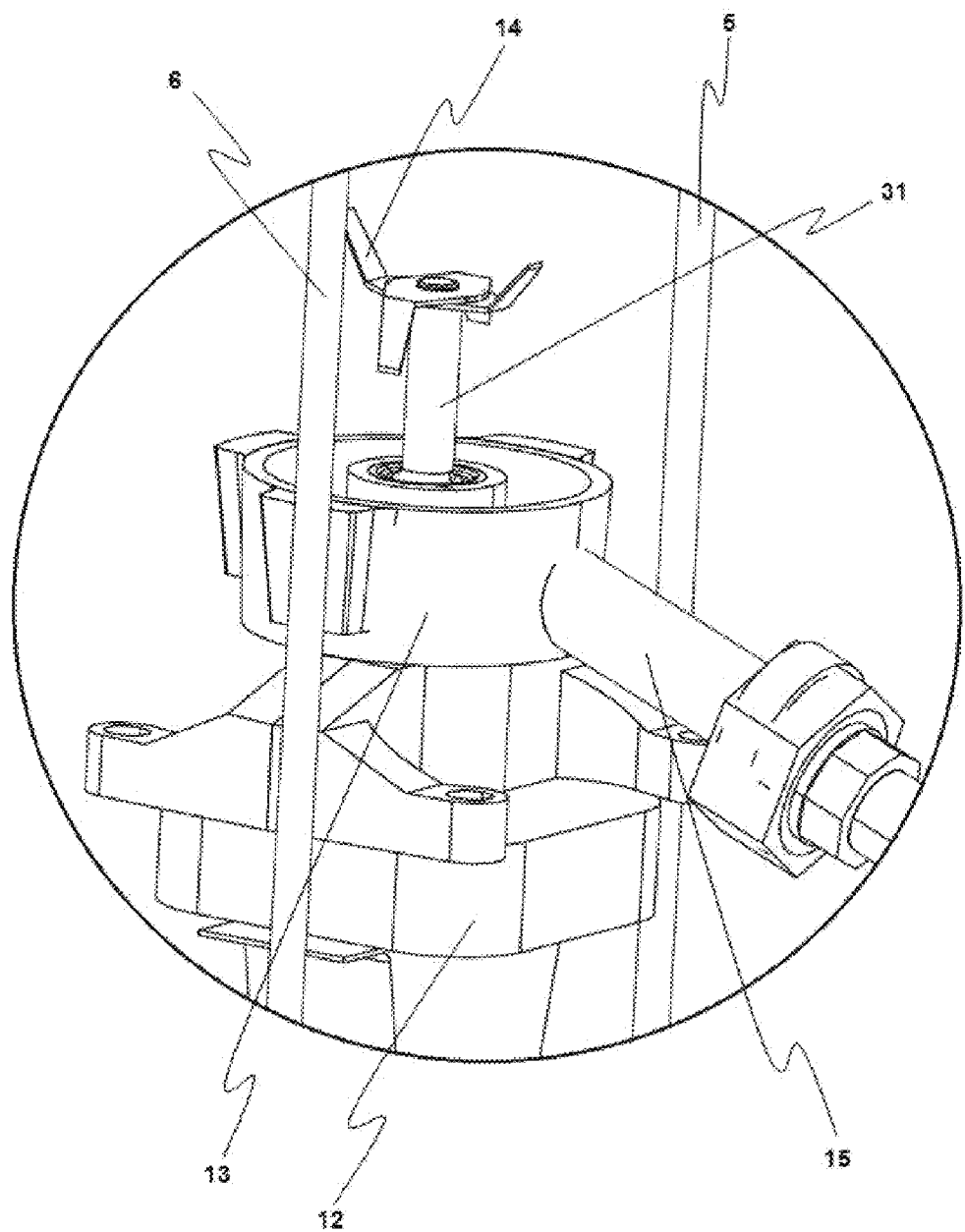
FIG. 7 shows an enlarged view of the rotor system with the blending blades of the machine of this invention.
Figure 8:
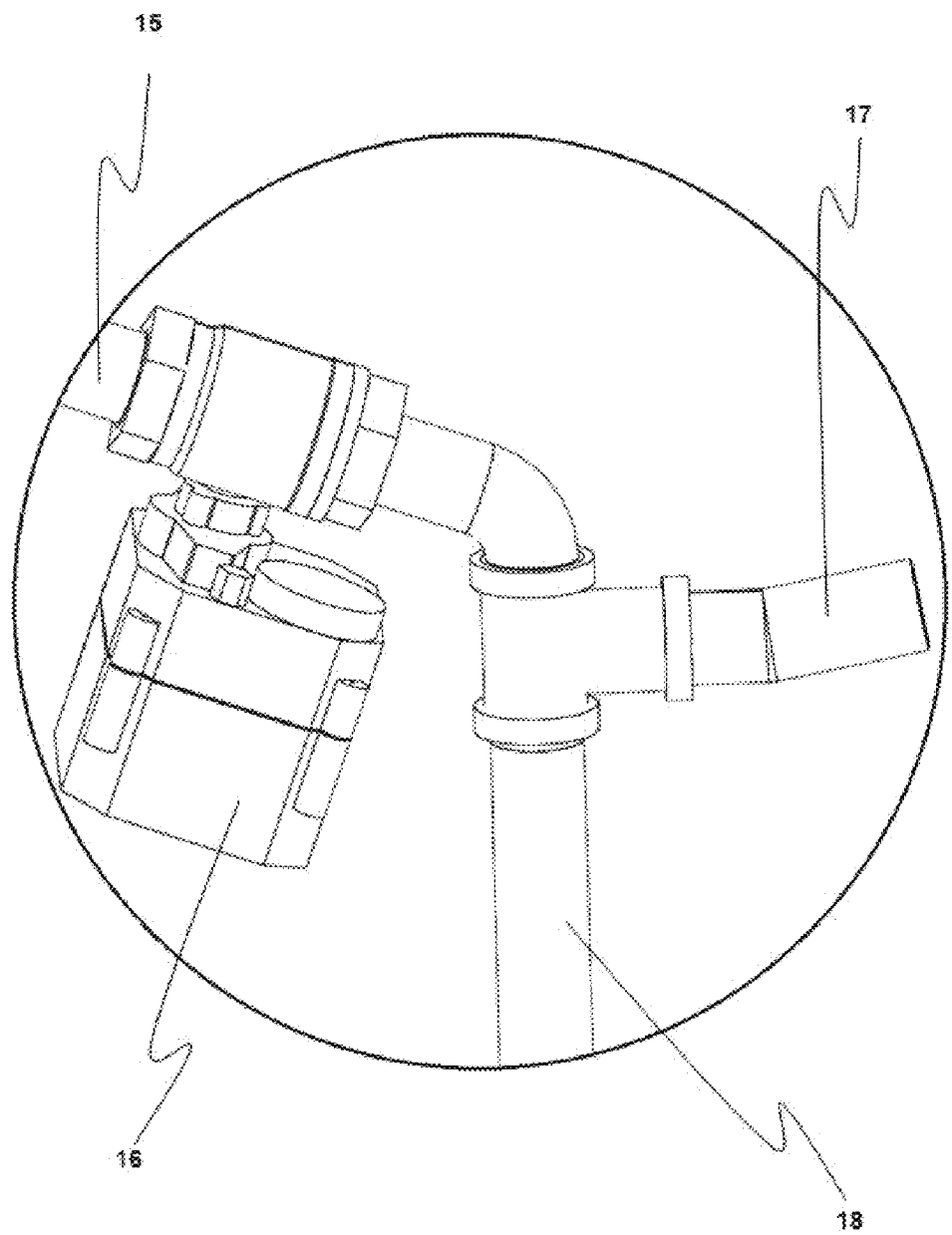
FIG. 8 shows an enlarged view of the by-pass valve to the dispensing nozzle of the machine of this invention.
Figure 9:
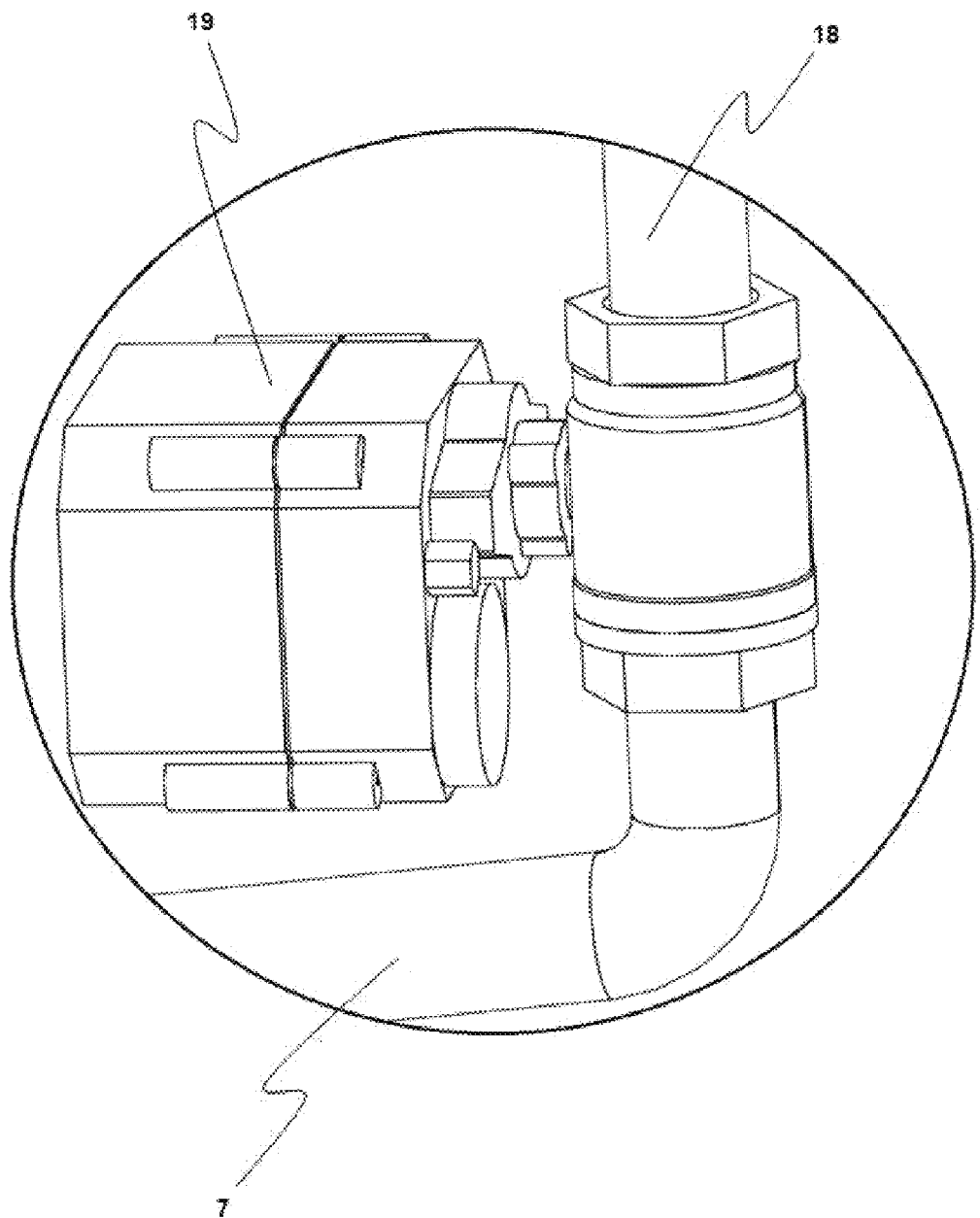
FIG. 9 shows an enlarged view of the by-pass valve to the discharge tube for the waste water used in cleaning the machine of this invention.
Figure 10:
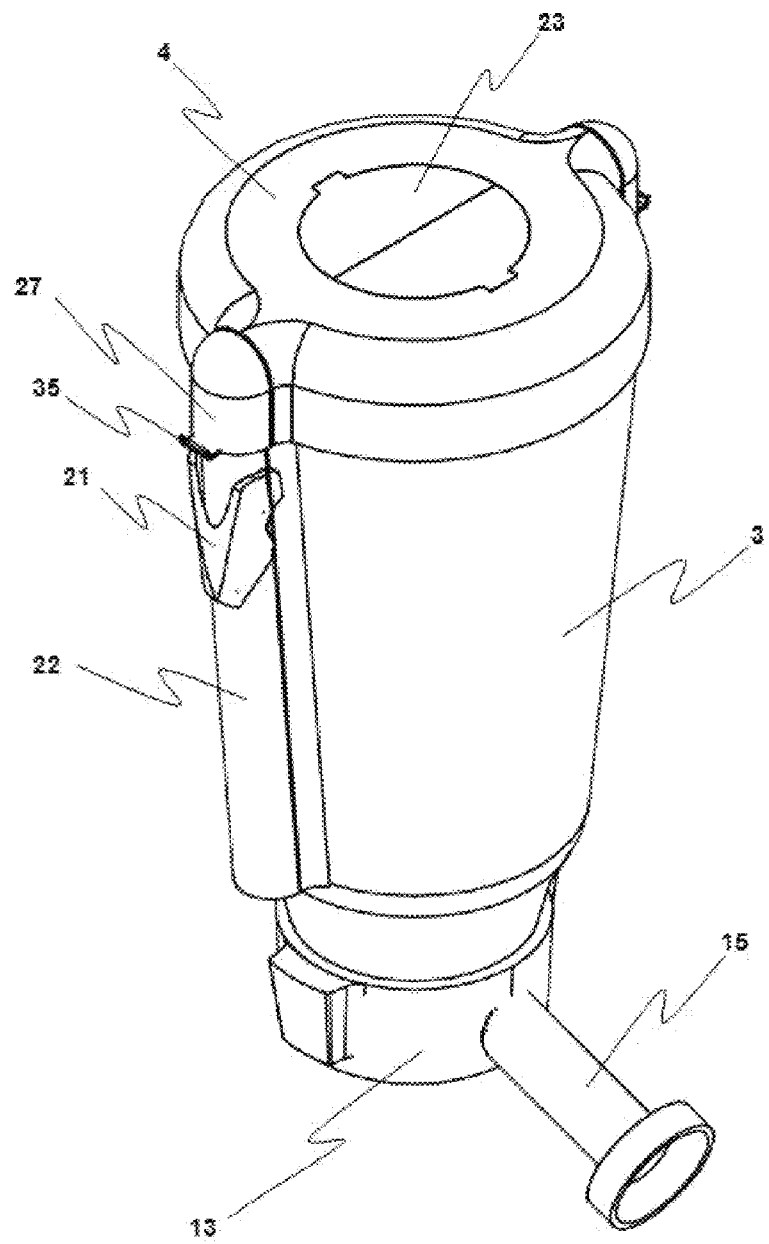
FIG. 10 shows an upper view of the blending compartment or jug of the machine of this invention.
Figure 11:
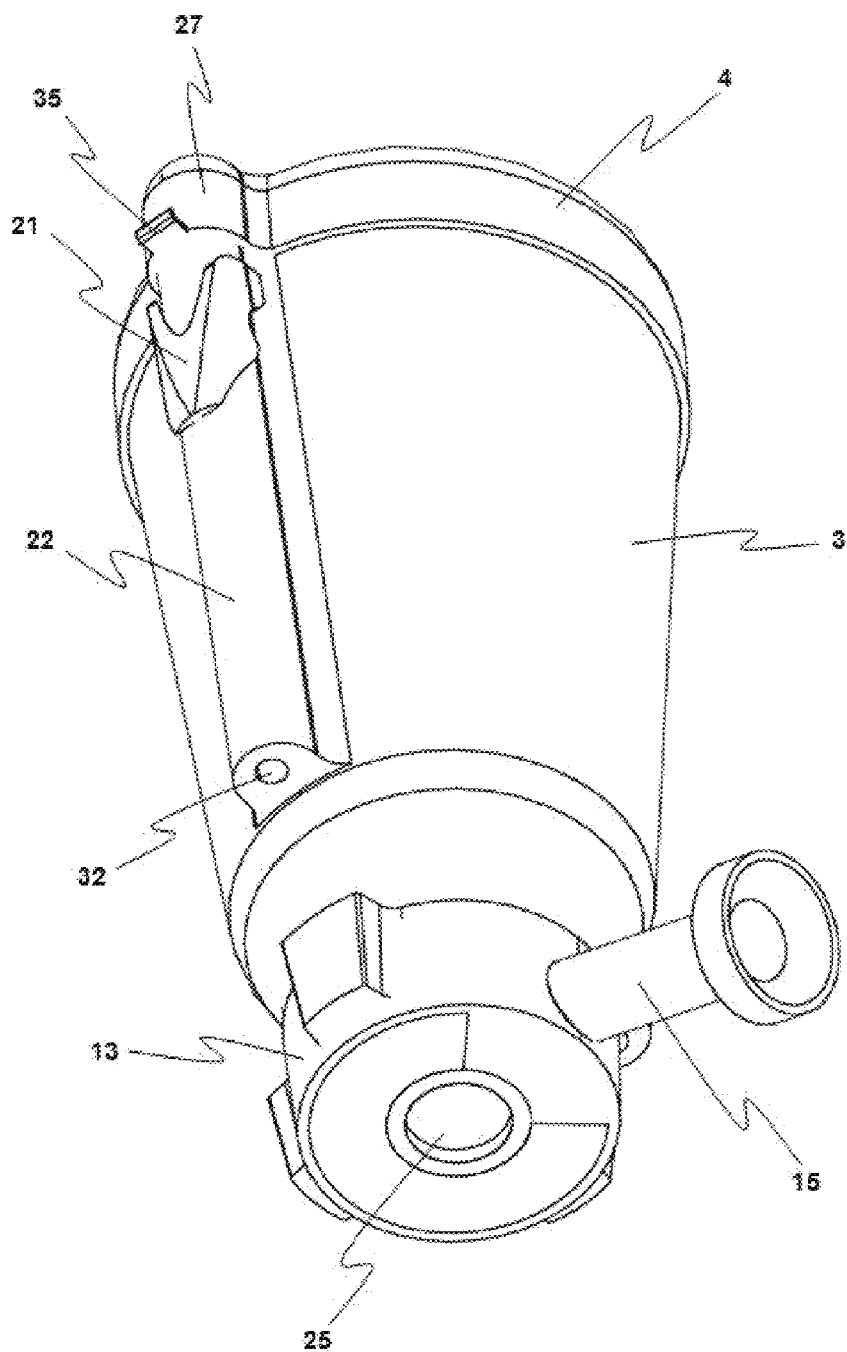
FIG. 11 shows a lower view of the blending compartment or jug of the machine of this invention.
Figure 12:
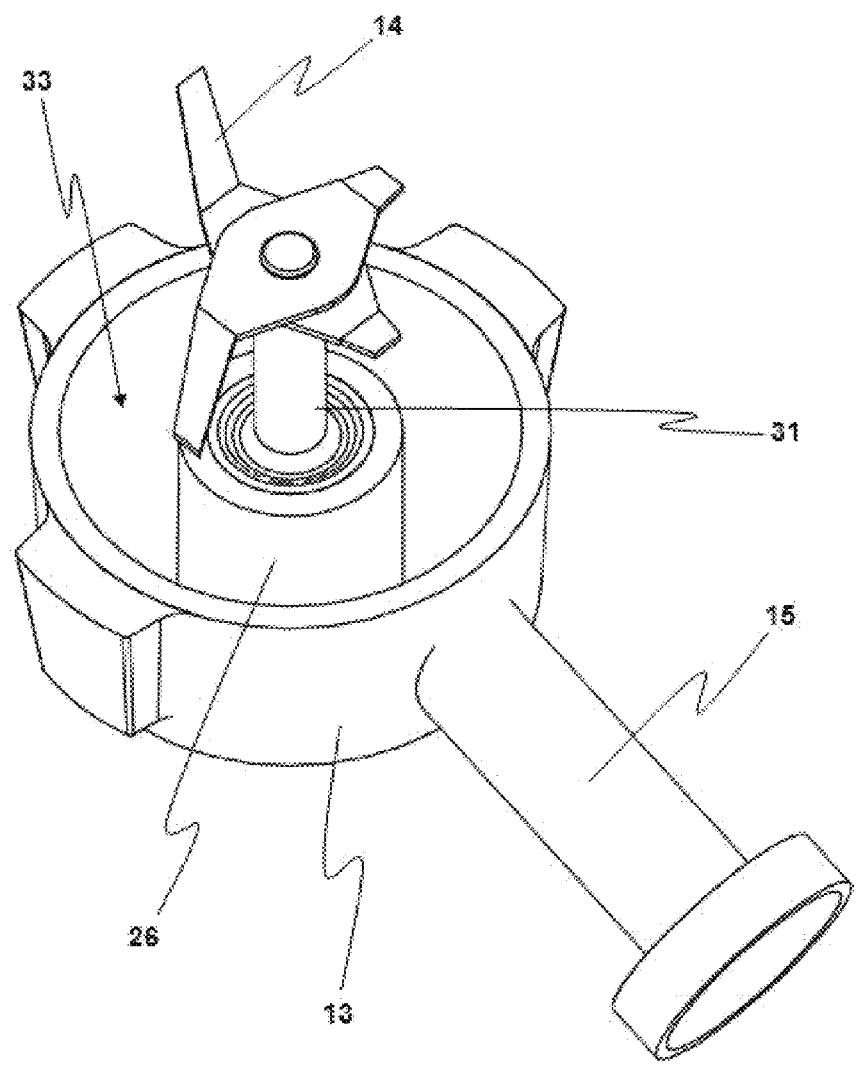
FIG. 12 shows a view of the joining part of the blending compartment or jug of the rotor system with the blending blades of the machine of this invention.
Figure 13:
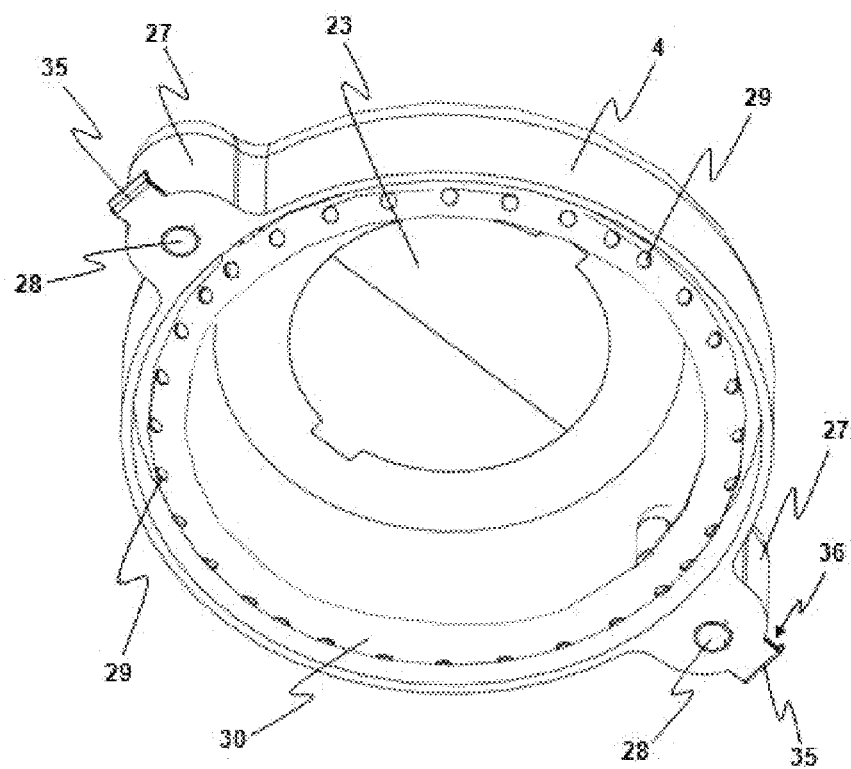
FIG. 13 shows a lower view of the blending compartment lid or jug of the machine of this invention.
Figure 14:
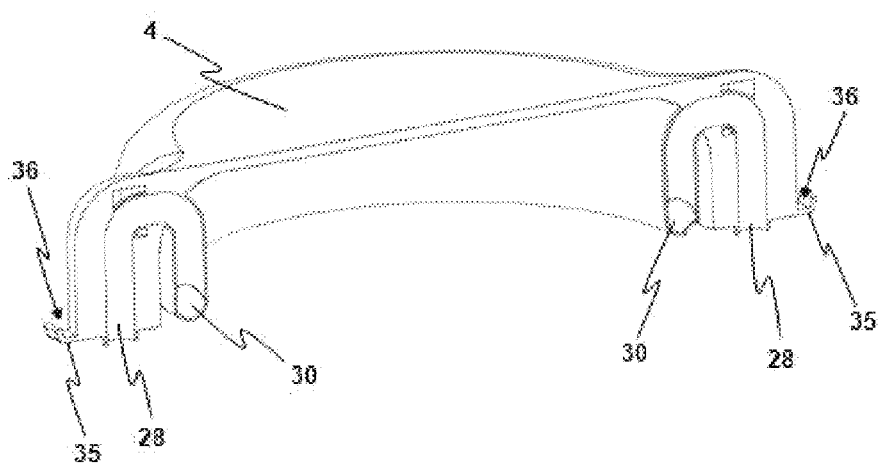
FIG. 14 shows a cross-section view of the blending compartment lid or jug of the machine of this invention.

This invention relates to a compact blender and a method to process foodstuff, especially for fast preparation of fruit juice in individual servings for immediate consumption at points of sale such as restaurants, bars, supermarkets, and offices as well as for home use. Also, this machine is able to dispense different flavors from one serving to the next, without the operator having to clean the blending compartment between servings and without the need of having different compartments for prepared juice of different flavors. The basic ingredient for the preparation process is frozen fruit pulp. This pulp should not be mistaken for the so-called fruit concentrate. The pulp used in this machine is 100% natural fruit, from which water has been removed through a quick freezing process. The pulp contains all ingredients of fruit, including vitamins and minerals. The pulp must be kept frozen, since it is highly perishable (not pasteurized, no preservatives added). By adding water to the frozen pulp and mixing, a natural fruit juice can be obtained.

The machine is mainly made up by a joint assembly of components including a connection to tap water or fixtures of the public utility service that have a preset pressure, a valve for water dosing, a jug or compartment for the blended product and the lid, an electric motor, outlet valves, a control unit/processor, and a connection to a drain or sewer.

If there is no tap water connection available near the machine, it can be connected to a water supplying tank while the connection to the sewer can be made through a wastewater storage tank.

In reference to the figures, the blending machine (1) of the present invention is made up by a casing (2) over which a blending compartment or jug is placed (3), which has a tight lid (4) with an inlet opening (23) for capsules of frozen fruit. The casing (2) has a hinged lid (24) allowing access to the inside of the blending machine components (1). The casing is supported by a base (20), which has a supporting grid plate (8) in the front part as to hold the cup where the juice is to be dispensed once the capsule has been processed along with the water. The base (20) has a control unit/processor (not shown) inside that allows controlling processing times and the opening or closing of valves.

The blending machine (1) provides for a tube to connect to the drinking water system (9), which supports conventional fittings for tap water such as those commercially available or at any home. This connection tube to the drinking water system (9) has a water dosing valve (10) that allows passing through, dosing, and delivery of water with sufficient pressure to the blending compartment or jug (3). The water flows from the drinking water connection tube (9) to a splitting device (11). From this point at least one inlet tube (5, 6) emerges connecting to the blending compartment or jug (3). This compartment has at least one guide (22) with a cavity for the guide (32) for at least one inlet tube (5, 6) that allows the passing of water into said blending compartment (3). In addition, the lid (4) has several external protrusions (27) with inner cavities (28) connecting on their inside to a circular duct (30) that has a plurality of slightly tilted holes (29) conveying drinking water inside the blending compartment or jug (3). For the latter to occur, both the guide cavities (32) and the inner cavities (28) of the lid (4) should be aligned, as to facilitate the flow of water.

When the capsule of frozen fruit is introduced through the hinged lid (23) and the start button (not shown) located outside the casing (2) is pushed, the exact amount of water is dosed through the water-dosing valve (10), and once the water enters the blending compartment or jug (3), the motor (12) starts operating thus making the blade (14) supporting rotor axle (31) turn. When these blades (14) rotate, the water mixes with the frozen fruit capsule producing the juice that will be dispensed.

Once the juice generating phase ends, the juice flows out by gravity through the tilted sleeve (15) connected to the jug holder (13) that supports the blending compartment or jug (3). The delivery of juice is produced because the blending compartment or jug (3) is located upstream from the tilted tube (15), and the flow valve (16) located downstream from the tilted tube (15) opens. Thus the juice flows by gravity from the blending compartment or jug (3) to the dispensing tube (17) at which end the juice is dispensed. The juice is delivered to the cup placed on the supporting grid plate (8) at the base (20). The dispensing tube (17) can be slightly tilted upwards or it can be curved, or with a slight projection at the inlet, in order to prevent the juice from being contaminated with rinsing water.

Figure 15:
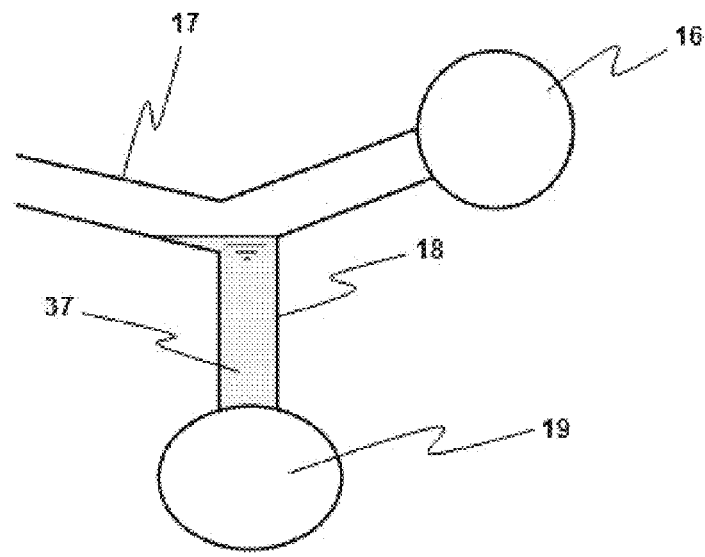
FIG. 15 shows a scheme of dispensing tube.

Once the juice has been dispensed, a cleaning phase takes place, where the water dosing valve (10) is operated and the drainage valve (19) is opened. Thus a flow of water is generated through the drinking water connection tube (9) to the splitting device (11) and to at least one of said inlet tubes (5, 6) that fits into at least one guide cavity (32) of at least one said guide (22) of the blending compartment or jug (3). The cleaning water continues to flow to the inner cavities (28) of the lid (4) connected to the circular duct (30) that has a plurality of tilted holes (29), which deliver the cleaning water to the inner surface of the blending compartment or jug (3). At this point, said cleaning water flows over said inner surface rinsing the residues of previously prepared juice. The rinsing wastewater flows out by gravity through the tilted tube (15), as the flow valve (16) remains open. Thus, said rinsing water continues to flow to the dispensing tube (17) and to the drainage tube (18) through the opening of said drainage valve (19), where water flows to the outlet through the waste water tubes (7) and is then removed. This drainage (18) emerges after the flow valve (16) and before the dispensing tube (17). The dispensing tube (17) may be slightly tilted upwards or may be curved or may have a slight protrusion in the inlet as to prevent juice contamination with rinsing water (37) during the cleaning phase of a previous cycle with a V1 volume and which then later remains in the drainage tube (18) which has a V2 volume, where V1 volume is equal to V2 volume as shown by FIG. 15.

When the blending machine (1) has completed a full working cycle, for instance at the end of a working day, the machine can be thoroughly cleaned. For this, hot water can be poured into the blending compartment or jug (3) and if necessary, a commercial cleaning or disinfection tablet can be added by placing a cup, bottle or jug on the supporting grid plate (8) at the base (20). After that, the operator pushes a cleaning button preferably located inside the blending machine (1) where access is provided through the hinged lid (24). The water-dosing valve (10) starts operating with the flow valve (16) open, thus a flow of water is generated through the connection tube to drinking water (9), to the splitting device (11), and to at least one of said inlet tubes (5, 6). The cleaning water reaches the inner cavities (28) that are connected to the circular duct (30), which, through the plurality of tilted holes (29), injects cleaning water into the inner wall of the blending compartment or jug (3). The flow valve (16) and the drainage valve (19) open allowing the water to flow through the waste water tube (7) wherein used water is removed. This phase may be repeated several times according to the program in operation in the control unit/processor. The flow valve (16) and drainage valve (19) continue to operate by opening and closing alternatively according to the program running in the control unit.

Figure 16:
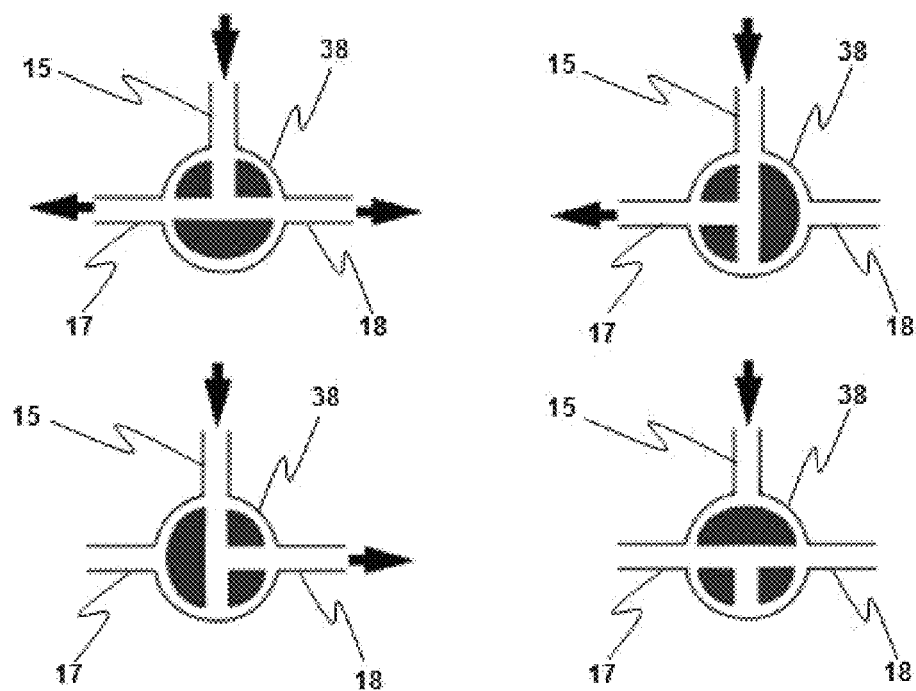
FIG. 16 shows an alternative scheme including the dispensing and discharging valves in one single valve.
Figure 17:
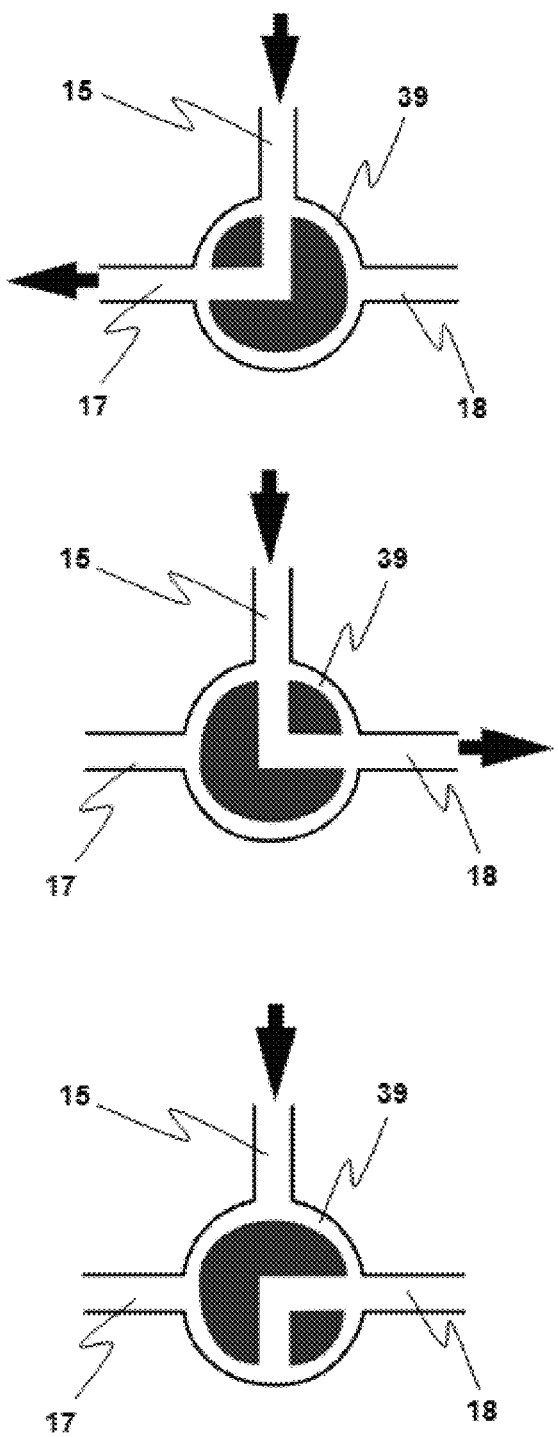
FIG. 17 shows another alternative scheme including the dispensing and discharging valves in one single valve.

As shown by FIG. 16, the dispensing valves (16) and drainage valves (17) can be shaped as one single three-way valve (38) that may have four positions: a first opening to the dispensing tube (17) and drainage tube (18), a second opening to the dispensing tube (17), a third opening to the drainage tube (18), and a fourth that is closed.

The blending compartment or jug (3) is independent from the blending machine (1) but it is attached to it through a central supporting device (13) that has in its inside a cylindrical cap (26) with a cavity (25). Thus, between said cylindrical cap (26) and the inner wall of the supporting device (13) periphery, a coupling clearance (33) is generated where the lower portion of the blending compartment or jug (3) is introduced. Said coupling clearance (33) and the lower portion of the blending compartment or jug (3) have joining or coupling means, for example threads or a tight tongued and grooved mechanism. Through the cavity (25) of the cylindrical cap (26) the blade-supporting (14) rotor axle (31) is introduced.

The lid (4) has a sealing clearance (34) located between the circular duct (30)—which has a plurality of holes (29)—and the inner surface of the external wall of said lid (4). This sealing clearance (34) may have sealing means, for example an elastomer ring, to an effect that when touching the upper edge of the mouth of the blending compartment or jug (3), the whole assembly is tightly closed. To this effect, the lid has lugs (35) attached thereto in the external projections (27) with a cavity (36) as a socket element to engage with a plug element, such as a pin (not shown), located in the upper portion of the guides (22) of the blending compartment or jug (3), which adjust and tighten through a pivotal mechanism (21) located in the upper portion of the guides (22) of the lid (4).

In order to make the compact blending machine (1) able to process juice, the method comprises the following steps:

(a) Opening of the inlet hole (23) of the lid (4) of the blending compartment or jug (3) and the introduction of an individual capsule of frozen fruit pulp in said blending compartment or jug (3);

(b) Placing a cup on the supporting grid plate (8) below the dispenser;

(c) Pushing the start button.

By pushing the start-up button of the compact blending machine, the following steps are automatically performed:

(d) Adding a portion of water by the operation of a water dosing valve (10) that makes said water to flow through a connection tube to the drinking water (9), to a splitting device (11), and to at least one of the inlet tubes (5, 6) connecting to at least one guide cavity (32) of at least one guide (22) of said blending compartment or jug (3), wherein the water flows to the inner cavities (28) of the lid (4) that are connected to a circular duct (30) which has a plurality of holes (29) that deliver the water to the inside of the blending compartment or jug (3);

(e) Mixing the pulp with water in the blending compartment or jug (3) by driving a motor (12) that operates the blades (14) for blending, operating said motor in at least one speed, preferably two different speeds in order to obtain the best mix.

(f) Opening the flow valve (16) for the juice to flow through a tube (15) by gravity from the blending compartment or jug (3) to the dispensing tube (17), at which end the juice is dispensed to the cup located on the supporting grid plate (8) of the base (20);

(g) Opening the drainage valve (19);

(h) Rinsing the blending compartment or jug (3) by adding a portion of water through the operation of a water dosing valve (10) that makes the water flow from said connection tube to the drinking water (9), to said compartment or jug (3), and (i) Discharging waste water by opening a drainage valve (19) in order to force that water flow through the tube for waste water (7) where used water is removed;

(j) Closing the flow valve (16) and the drainage valve (19).

When an operating cycle ends, for instance at the end of a working day, a self-cleaning program may be executed. To this effect, the method also comprises the following steps:

(k) Filling the blending compartment or jug (3) with a certain amount of hot or boiling water and, if necessary, a commercial cleansing tablet can be added;

(l) Placing a cup, bottle or jug on the supporting grid plate (8) of the base (20);

(m) Pushing the cleaning button.

By pushing the cleaning button, the machine performs the following steps:

(n) Turning the rotor blades (14) by driving the motor (12), as to generate a hot water whirl, and, if necessary, to dissolve the cleansing tablet;

(o) Opening and closing the flow valve (16) and the drainage valve (19) consecutively, as to force the water to drip through the residual water tube (7), where used water is removed several times in order to clean the valves, tubes and dispenser, as well as to rinse the blending compartment or jug (3). Part of the water is distributed to the cup, bottle or jug placed on the supporting grid plate (8) and another part is used for drainage. Some parts of the machine, such as the blending compartment or jug and lid, may be dismounted for the purpose of cleaning by hand; and (p) Closing the flow valve (16) and drainage valve (19).

What is claimed is:

1. A compact blending machine that allows processing of an individual package or capsule of frozen fruit pulp by pushing just one button, mixing said capsule with water to produce a cup of juice quickly and that is ready to be served, wherein said machine also has cleaning means that makes the machine ready to be used again in few seconds, comprising:

a casing over which a blending compartment or jug is located, said blending compartment or jug having a tight lid with an inlet opening for capsules of frozen fruit;

said blending compartment or jug having in its interior a rotor with an axle supporting blades;

a motor to drive said axle and blades;

a connection tube to drinking water with joining means to conventional tap water connectors at the first end and a splitting device connected at the second end;

a water dosing valve connected to said drinking water connection tube to dose and deliver enough pressure to the water distributed to said blending compartment or jug;

at least an inlet tube emerging from a splitting device and engaging in at least one guide with at least one guide cavity located in said blending compartment or jug that allow water passing to the inside of said blending compartment;

at least one external projection with at least one inner cavity located in said lid that connects inwards to a circular duct that has a plurality of holes to introduce drinking water to the inside of the blending compartment or jug, where said at least one inner cavity and said at least one cavity of guides are aligned;

a tilted tube from a jug supporting device supporting said blending compartment or jug upstream, where downstream of said tilted tube there is a flow valve allowing the juice to flow by gravity; and a dispensing tube from said flow valve at which end the juice produced is dispensed to a cup placed on a supporting grid plate of a base that supports said casing.

2. A compact blending machine according to claim 1 WHEREIN it also comprises:

a drainage tube for the discharge of washing water from the rear of the flow valve and before the dispensing tube; and a drainage valve connected to said drainage tube allowing the washing water to pass to a waste water tube at which end the washing water is removed.

3. A compact blending machine according to claim 1 WHEREIN the casing has a hinged lid.

4. A compact blending machine according to claim 1 WHEREIN said jug holder has a cylindrical cap in its center with a cavity providing a coupling clearance between said cylindrical cap and the inner wall of the supporting device periphery.

5. A compact blending machine according to claim 4 WHEREIN said coupling clearance and the lower portion of the blending compartment or jug has joining or coupling means.

6. A compact blending machine according to claim 5 WHEREIN said joining or coupling are made up by threads.

7. A compact blending machine according to claim 1 WHEREIN said lid has a sealing clearance which is located between said circular duct and the inner surface of the external wall of said lid.

8. A compact blending machine according to claim 7 WHEREIN said sealing clearance has a sealing means.

9. A compact blending machine according to claim 8 WHEREIN said sealing means are made up by an elastomer ring.

10. A compact blending machine according to claim 1 WHEREIN said lid has in its external protrusions lugs with a cavity shaped as a socket that engages a plug located in the upper portion of the guides of the blending compartment or jug, which adjust and tighten through a pivotal mechanism also located in the upper portion of the guides of the lid.

11. A compact blending machine according to claim 1 WHEREIN said base has in the inside a control unit/processor.

12. A compact blending machine according to claim 1, WHEREIN said dispensing tube is slightly-tilted slightly upwards.

13. A compact blending machine according to claim 1 WHEREIN said dispensing tube is curved.

14. A compact blending machine according to claim 1 WHEREIN said dispensing tube has a slight protrusion at its inlet to prevent the juice from being contaminated.

15. A compact blending machine according to claim 1 WHEREIN said dispensing valves and drainage valves are made up as one single three-way valve.

* * * * *